United States Patent
Bruder

(10) Patent No.: US 6,327,393 B1
(45) Date of Patent: Dec. 4, 2001

(54) METHOD AND APPARATUS TO TRANSFORM A REGION WITHIN A DIGITAL IMAGE USING A DEFORMABLE WINDOW

(75) Inventor: Niclas Bruder, Portland, OR (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/135,112

(22) Filed: Aug. 17, 1998

(51) Int. Cl.$^7$ ................................. G06K 9/42; G06K 9/44
(52) U.S. Cl. .................... 382/256; 382/282; 382/215; 358/453
(58) Field of Search ...................... 382/256, 282, 382/283, 215, 293, 295; 345/340, 342; 358/453, 452; 707/520, 521

(56) References Cited

U.S. PATENT DOCUMENTS 5,428,721 * 6/1995 Sato et al. ........................... 345/433
5,485,561 * 1/1996 Iizuka et al. ....................... 345/433

OTHER PUBLICATIONS

Cognex 3000/4000/5000 Vision Tools Manual, Revision 7.4 590–0136, Cognex Corporation, Chapter 8—Optical Character Recognition, 1996, pp. 353–430.

Cognex 3000/4000/5000 Vision Tools Manual, Revision 7.4 590–0136, Cognex Corporation, Chapter 12—Scene Angle Finder, 1996, pp. 501–515.

Cognex Checkpoint Machine Vision System User's Guide, Cognex Corporation, Chapter 11—Using the Region Tool, 1995, pp. 311–318.

* cited by examiner

*Primary Examiner*—Thomas D. Lee
(74) *Attorney, Agent, or Firm*—Tracy Calabresi

(57) ABSTRACT

A method and apparatus is provided for intuitively, graphically parameterizing a region of an input image to be processed by a machine-vision vision system, the region being defined by a deformable window, where the window is deformed by a user using a pointing device. The window pictorially indicates the defined region to the user. The region identified and parameterized is transformed into a destination region. A preferred embodiment is a parameterization of a polar region and the subsequent transformation of the polar region into an OCR rectangular window that is then available for further processing, such as by an OCR software application.

23 Claims, 15 Drawing Sheets

METHOD AND APPARATUS TO TRANSFORM A REGION WITHIN A DIGITAL IMAGE USING A DEFORMABLE WINDOW

FIELD OF THE INVENTION

This invention relates to machine vision, and particularly to a user interface for visually partitioning and optionally transforming a region of interest within an image for further processing by a machine-vision vision system.

BACKGROUND

Optical character recognition ("OCR") systems are used in many industrial applications. In semiconductor manufacturing processes, OCR is used to read laser-etched serial numbers on wafers at many stages of the process, such as during test and assembly steps. In a typical wafer reading application, a machine-vision vision system is directly integrated with a piece of process equipment, such as a wafer handler or sorter, or is positioned at a dedicated reading station. In either case, the vision system uses an imaging device to capture an image of each semiconductor wafer. The vision system then compares each character in the wafer serial number to a pretrained font stored in memory. The character is identified when a match in memory is located.

Size differences between the image of the characters and the pretrained fonts often hamper proper identification of the characters. More particularly, the pretrained fonts stored in memory form a template. Typically, the template is a matrix of pixels. Each of the characters of the image are also represented as a matrix of pixels. When the template is compared with the character in the image, each pixel of the image is compared with each pixel of the template. The character can only match the template if the character size in the image of the wafer and the character size of the template are substantially the same. When the size of the character in the image and the size of the pretrained font differ, no match is found, and, therefore, the character is not identified.

To correct the problem, typically the image of the wafer is scaled so that it will match the appropriate template. The machine-vision vision system determines the size of the characters in the image of the wafer as a percentage of the size of the characters stored in memory by using calibration data obtained during set-up, such as magnification. The vision system then scales the stored font so that it can accurately identify the characters at run-time.

The OCR calibration step typically requires an operator to describe how the source images are distorted. Commonly, the operator describes the source image by entering numeric values of angles and coordinates using a keyboard. When the area that needs to be characterized by the user is irregular, such as a polar region on a wafer, it becomes intuitively difficult for the operator to guess an arc that fits the area.

SUMMARY

A method is disclosed for partitioning a region of interest in a digital image using a deformable window, the region of interest is then parameterized and input into a machine-vision vision system for further processing. The method allows a user to intuitively segment the region of interest using a deformable window. The deformable window is displayed on a graphical user interface superimposed upon the digital image.

A user specifies a shape and position of the deformable window so as to enclose the region of interest that will be processed. The deformable window enables the user to identify the region of interest graphically, eliminating the need for the user to conceptually estimate the region and input numerical parameters for the region. The deformable window is defined by using a pointing device that, in a preferred embodiment, can be used to translate, rotate, curve, skew, and scale the deformable window.

Thereafter, the region of interest is parameterized and transformed to a destination window, and the parameters of the destination window are input into a machine-vision vision system for further processing. Optionally, the destination window can have any location or shape specified by the user, thereby, enabling further transformation of the input image.

The method and apparatus are particularly useful in OCR applications, wherein the destination window is a rectangular window appropriate for typical OCR processing. In this aspect, an embodiment of the method directed to parameterizing a polar region provides an advantage over the prior art. An advantage over the prior art is also provided by a further embodiment of the method that transforms the parameterized polar region. The transformed polar region is then input into an OCR application.

One advantage of the method of the invention is that a user no longer needs describe the region of interest by inputting parameters. The deformable window provides a more direct method for the user to communicate that information without requiring the user to characterize the region using numerical parameters. Another advantage of the invention is the ease with which an arc or other non-rectilinear regions of interest are identified and parameterized. In addition, these regions can then be transformed to a destination window having a size and shape of the user's choice that can then be used as input for further processing.

In further aspects, the invention provides an apparatus in accord with the method described above. The aforementioned and other aspects of the invention are evident in the drawings and in the description that follows.

BRIEF DESCRIPTION OF THE DRAWINGS

The invention will be more fully understood from the following detailed description, in conjunction with the accompanying figures, wherein.

DETAILED DESCRIPTION OF THE DRAWINGS

One aspect of the method and apparatus of the invention is a visual interactive means that enables a user to identify and parameterize a region, the image then being provided as input into an OCR program for further processing. Though this is a preferred embodiment and will be described as such, this embodiment should be considered illustrative, and not restrictive.

In one embodiment, the region of interest 306 within the deformable window 312 is characterized by the parameters of the deformable window, such as position, curvature, skew, rotation, width, and height, for example. Additional parameters or any subset of these parameters can characterize the deformable window, and the appropriate subset depends upon the application. In a preferred embodiment, the parameters are determined by computing the deformation of the window from its initial position and state on GUI 300 to its deformed state surrounding the region of interest on GUI 310, as will be further described below. Therefore, the user need not enter the parameters numerically through the keypad or by voice commands, for instance.

Figure 2:
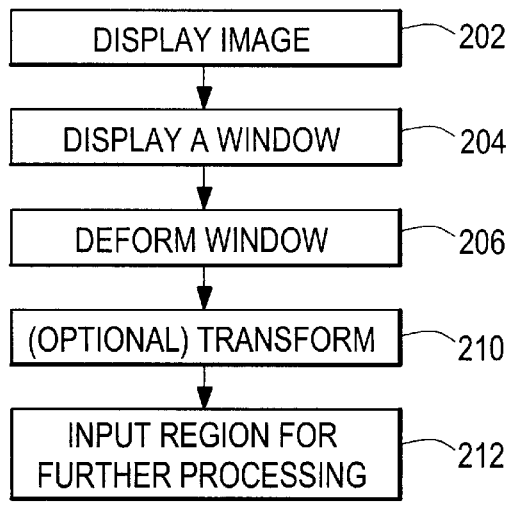
FIG. 2 is a flowchart of one embodiment of the method of the invention.

FIG. 2 is a flow chart of an overview of one embodiment of the invention, wherein the steps of the method will be denoted by parentheses in the detailed description. The first step is to display an image (202) of an object.

Figure 1:
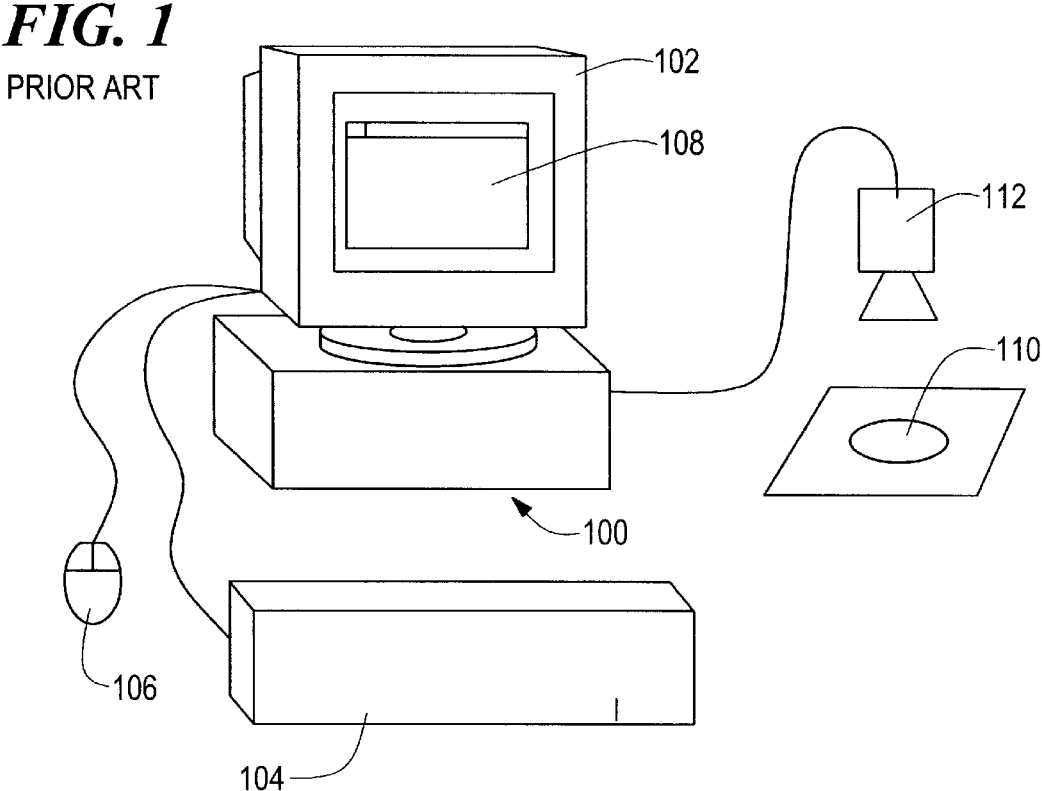
FIG. 1 is a diagram of a schematic overview of an embodiment of a system on which the method of the invention is practiced.

In one embodiment, the image of the object 110 is first acquired by the digital-imaging device 112 illustrated in FIG. 1. Typically in industrial applications, such as automated semiconductor manufacturing, the object 110 is imaged as it passes the digital-imaging device 112 on the assembly line (not shown), and the images are processed concurrently. Alternatively, the image of the object 110 is stored in memory, and later displayed and processed according to this method.

The digitized image is displayed on a graphical user interface (GUI) 108, where the GUI is provided on a display 102, such as a cathode ray tube, of a computer 100 having any variety of outputs and inputs, such as a keyboard 104 and a mouse 106, for example.

Figure 3A:
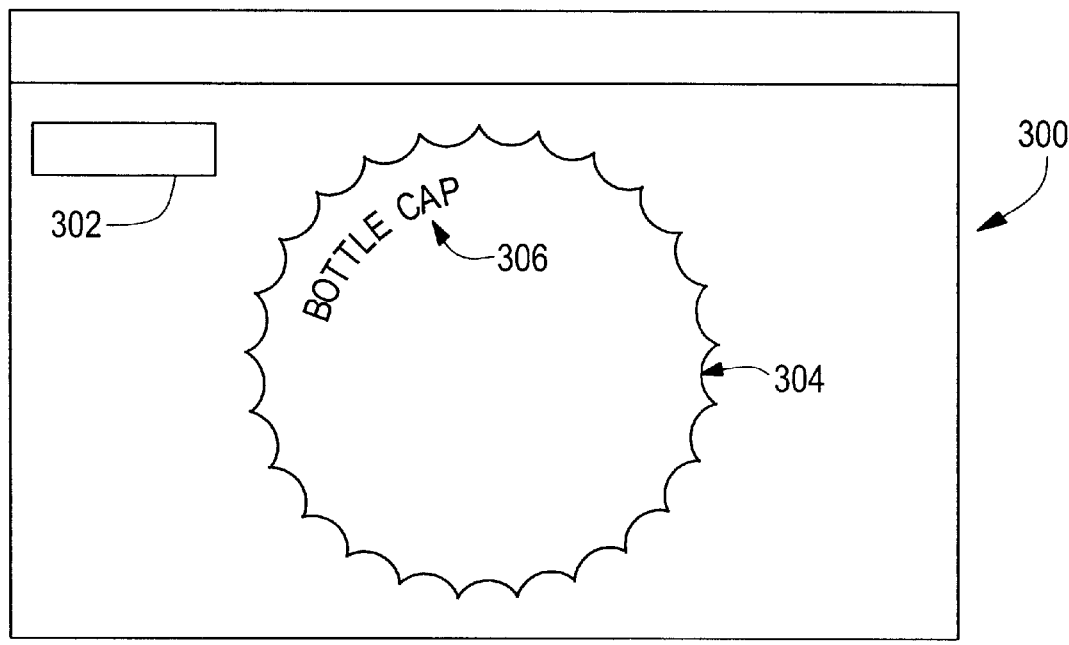
FIG. 3A is a representation of an image displayed on a graphical user interface having a deformable window and a top view of a bottle cap, where the bottle cap contains a character string, not drawn to scale.

In addition to the image of the object, the GUI also displays a deformable window (204). An example of a GUI 300 displaying a deformable window 302 and an image of a top view bottle cap 304 are illustrated in FIG. 3A.

Figure 3B:
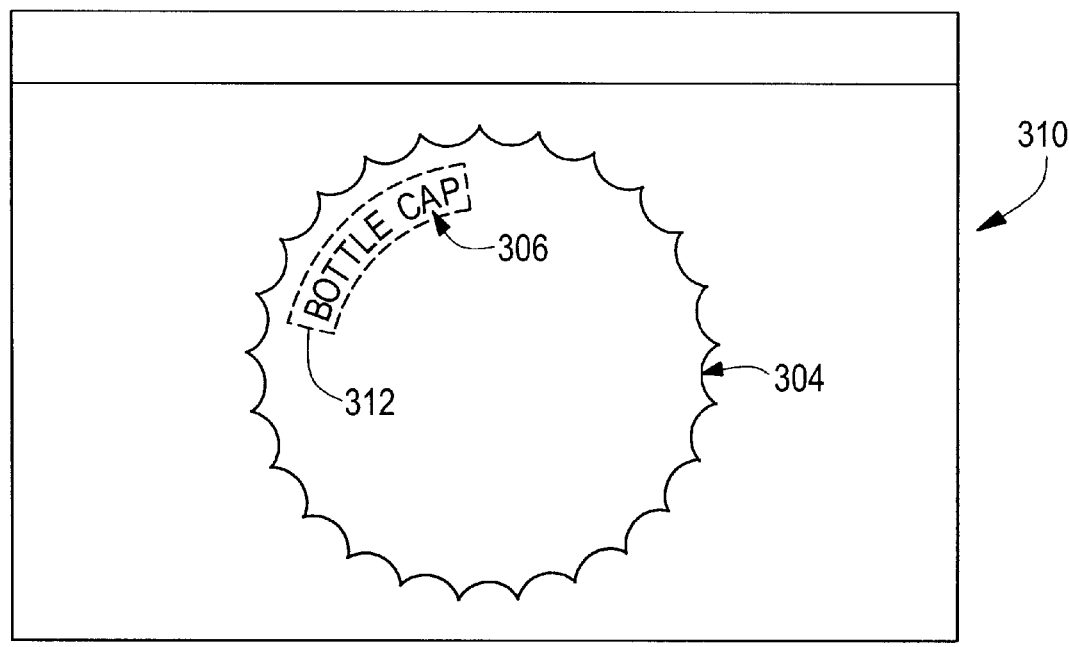
FIG. 3B is a representation of a deformable window enclosing the character string of the bottle cap of FIG. 3A, not drawn to scale.

In this example, the lettering 306 "BOTTLE CAP" is the region of interest that ultimately is read and verified by the OCR application software. However, typical OCR application software cannot read the lettering 306 without further processing of image of the lettering 306 and/or without being provided additional information about the lettering 306. A user identifies the region of interest by deforming the window (206) to enclose the lettering 306 "BOTTLE CAP", as shown in FIG. 3B. Once identified, the region of interest 306 within the deformed window 312 is sufficiently characterized, as described hereinafter, to allow the region of interest within the deformable window to be input for further processing (212).

Figure 4A:
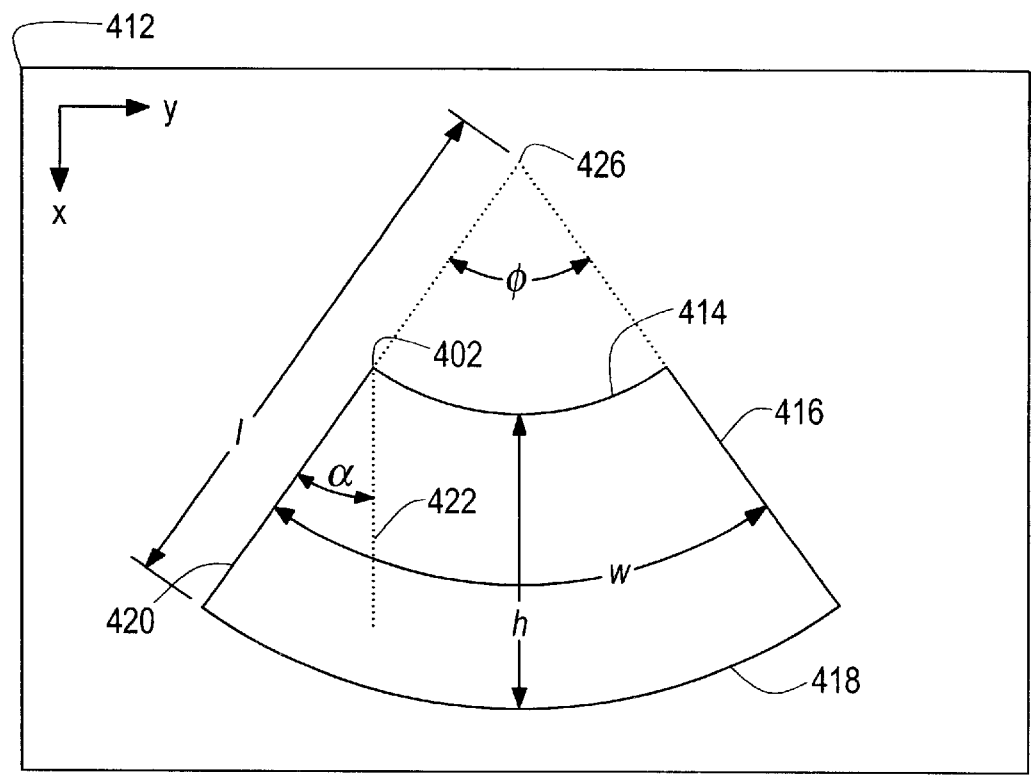
FIG. 4A is a representation of the variable s that define a region.
Figure 4B:
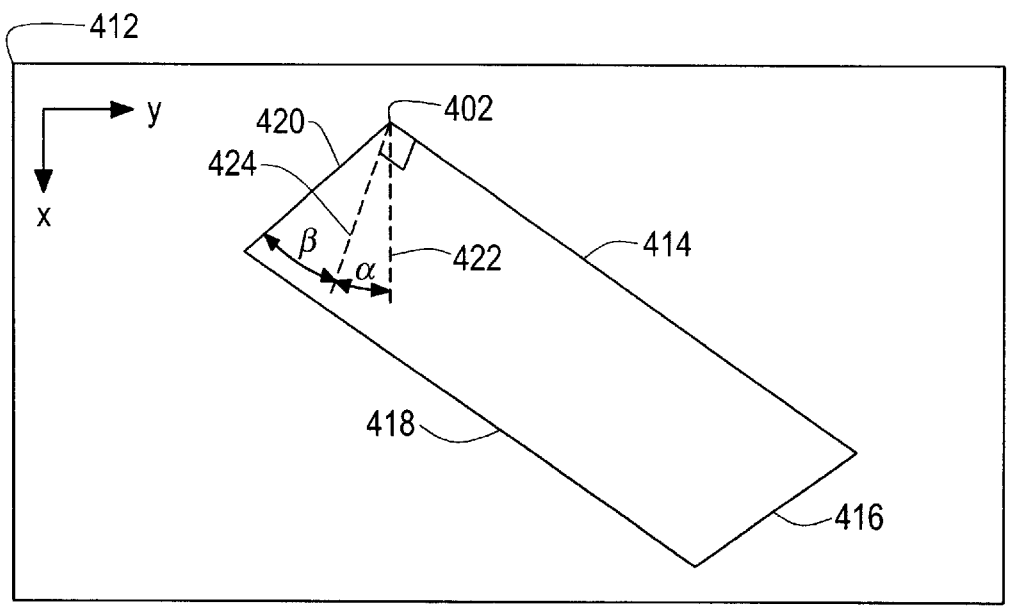
FIG. 4B is a further representation of the variables that define a region.

Turning to FIGS. 4A and 4B in a preferred embodiment, the parameters that define the deformable window include height, designated h, width, designated w, rotation angle, designated α, curvature, designated φ, skew, designated β, and the coordinates of an origin corner 402, designated ($x_{origin}$, $y_{origin}$). $x_{origin}$ and $y_{origin}$ are measured relative to the origin 412 of the image coordinate space 410. h is the distance from the middle of the first edge 414 of the deformable window to the middle of the third edge 418 of the deformable window; h cannot equal zero. w is the distance from the middle of the second edge 416 of the deformable window to the middle of the fourth edge 420 of the deformable window; w cannot equal zero. In FIG. 4A, α is the angle, measured clockwise, between the x-axis 422 extending from the origin corner 402 and the fourth edge 420. In the case of a skewed window, as shown in FIG. 4B, α is the angle, measured clockwise from x-axis 422 extending from the origin corner 402 and a line 424 orthogonal to the first edge 414 of the deformable window, where α is any value within the range 0°<=α<360°. φ is the angle, measured clockwise, between the second edge of the deformable window 416 and the fourth edge 420 of the deformable window, where $\phi$ is any value within the range of $-360° < \phi < 360°$. $\phi$ is positive if the third edge 418 of the deformable window is shorter than the first edge 414 and $\phi$ is negative if the first edge 414 of the deformable window is shorter than the third edge 418. $\beta$ is the angle, measured clockwise, between the line 424 orthogonal to the first edge 414 of the deformable window and the fourth edge 420 of the deformable window, where $\beta$ has a range of $-90° < \beta < 90°$. In this embodiment, the deformable window cannot be skewed and curved at the same time.

The deformable window 302 displayed on the GUI 300 can be drawn in numerous ways. One method is to assign the pixels of the deformable window 302 a single color value, such as red, and superimpose the deformable window 302 over the image. An example of an algorithm to draw a red deformable window for an uncurved and a curved region is given below.

Case One: Uncurved Region, $\phi$=zero
  for y=0 to h step h
    for x=0 to w step sign w
      $x_{deformed} = \cos\alpha*(x-\sin\beta*y) - \sin\alpha*\cos\beta*y + x_{origin}$
      $Y_{defined} = \sin\alpha*(x-\sin\beta*y) + \cos\alpha*\cos\beta*y + y_{origin}$
      $W(x_{deformed}, y_{deformed}) = $ "red"
    for x=0 to w step w
      for y=sign h to h–sign h step sign h
        $x_{deformed} = \cos\alpha*(x-\sin\beta*y) - \sin\alpha*\cos\beta*y + x_{origin}$
        $y_{deformed} = \sin\alpha*(x-\sin\beta*y) + \cos\alpha*\cos\beta*y + y_{origin}$
        $W(x_{deformed}, y_{deformed}) = $ "red"

where $W(x_{deformed}, y_{deformed})$ is a matrix of positions corresponding to a deformable window, such as window 302 in FIG. 3A, each having a red intensity value.

Figure 6A:
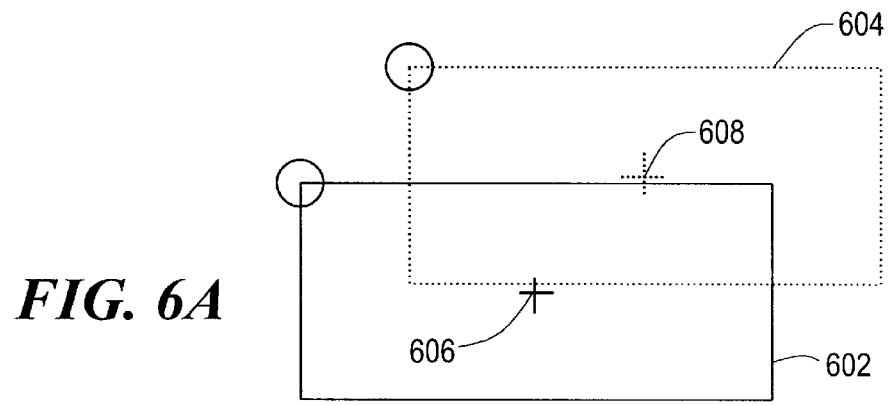
FIG. 6A is a representation of a deformable window before and after a translation.
Figure 6B:
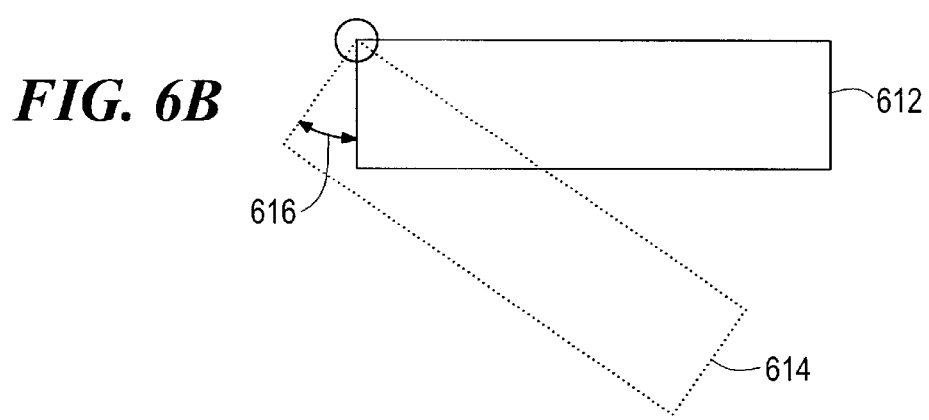
FIG. 6B is a representation of a deformable window before and after a rotation.
Figure 6C:
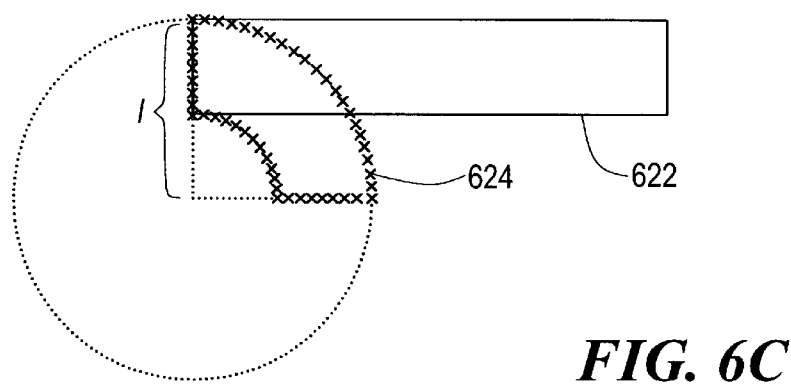
FIG. 6C is a representation of a deformable window before and after the deformable window has been curved.
Figure 6D:
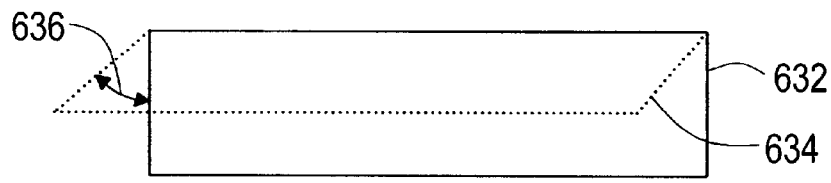
FIG. 6D is a representation of a deformable window before and after the deformable window has been skewed.
Figure 6E:
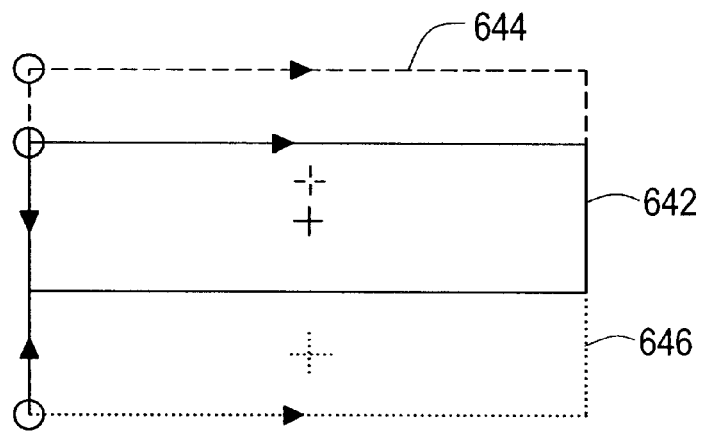
FIG. 6E is a representation of three deformable windows each having different heights, one deformable window represents a positive change in height, one deformable window represents a negative change in height, and one represents no change in height.
Figure 6F:
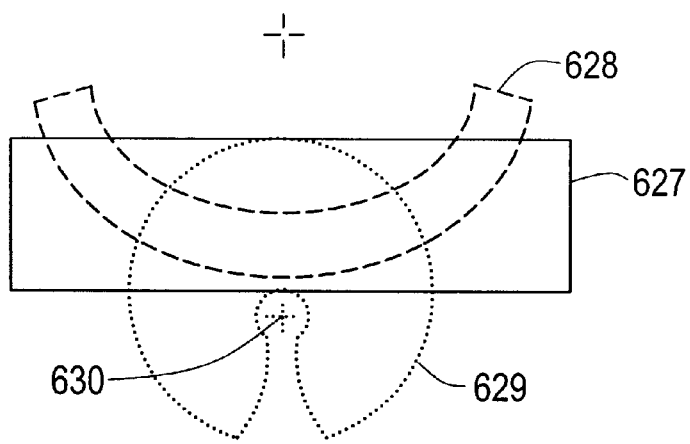
FIG. 6F is a representation of three deformable windows each being curved to a different extent, one deformable window represents a positive curvature, one deformable window represents a negative curvature, and one represents no curvature.

Case 2: Curved Region, $\phi$ does not Equal Zero
  $l = w*|\phi| + h/2*\text{sign}\phi$
  $x_{center} = -\sin\alpha*l*\text{sign}\phi + x_{origin}$
  $x_{center} = -\cos\alpha*l*\text{sign}\phi + y_{origin}$
  for y=0 to h step h
    for x=0 to w step sign w
      $x_{deformed} = \sin(\alpha+\phi*x/w)*(l-y*\text{sign }\phi)*\text{sign}\phi + x_{center}$
      $y_{deformed} = \cos(\alpha+\phi*x/w)*(l-y*\text{sign }\phi)*\text{sign}\phi + x_{center}$
      $W(x_{deformed}, Y_{deformed}) = $ "red"
    for x=0 to w step w
      for y=sign h to h –sign h step sign h
        $x_{deformed} = \sin(\alpha+\phi*x/w)*(l-y*\text{sign }\phi)*\text{sign}\phi + x_{center}$
        $y_{deformed} = \cos(\alpha+\phi*x/w)*(l-y*\text{sign }\phi)*\text{sign}\phi + x_{center}$
        $W(x_{deformed}, y_{deformed}) = $ "red"

where the angles are given in radians;
where $W(x_{deformed}, y_{deformed})$ is a matrix of positions corresponding to a deformable window, such as window 312 in FIG. 3B, each having a red intensity value;
where sign (variable)=1, if variable >0
  –1, if variable <0, and
  0, if variable =0;
where l is the radius of a circle containing the third side 418 when $\phi$ is negative as illustrated in FIG. 4A; and the radius of a circle containing the first side 414 when $\phi$ is positive, as is illustrated in FIG. 6F for window 629; and
where $(x_{center}, y_{center})$ are the coordinates of the center of the circle having radius l, such as point 426 illustrated in FIG. 4A.

Figure 12:
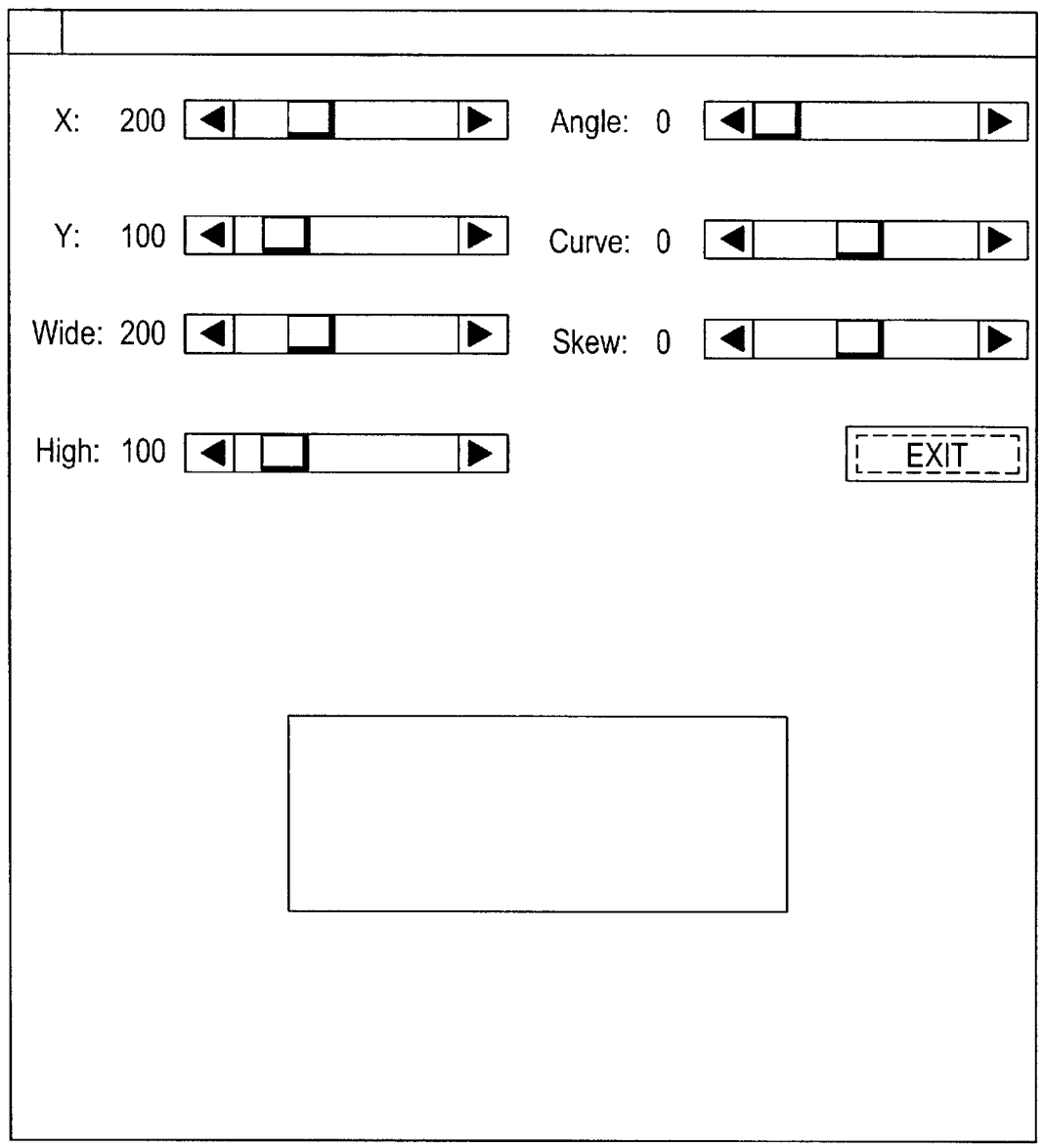
FIG. 12 is an example of an alternate embodiment to a pointing device that enables a user to define the deformable window.

The window is deformed according to input from a user through a pointing device such as a mouse, touch-screen, joy-stick, track-ball, for example. Alternatively, the user can indicate the deformations by increasing or decreasing variables using a keyboard combined with a user interface illustrating range controls, such as that shown in FIG. 12.

The user deforms the deformable window by dragging portions of the deformable window until the deformable window encloses the region of interest. A window can be dragged using known techniques, one example is set forth in MSDN Library Edition —July 1998: SDK Documentation, Book: Platform SDK, Section: User Interface Services, Chapter: User Input, Section: Mouse Input. Published by Microsoft Press, Microsoft.

Figure 5:
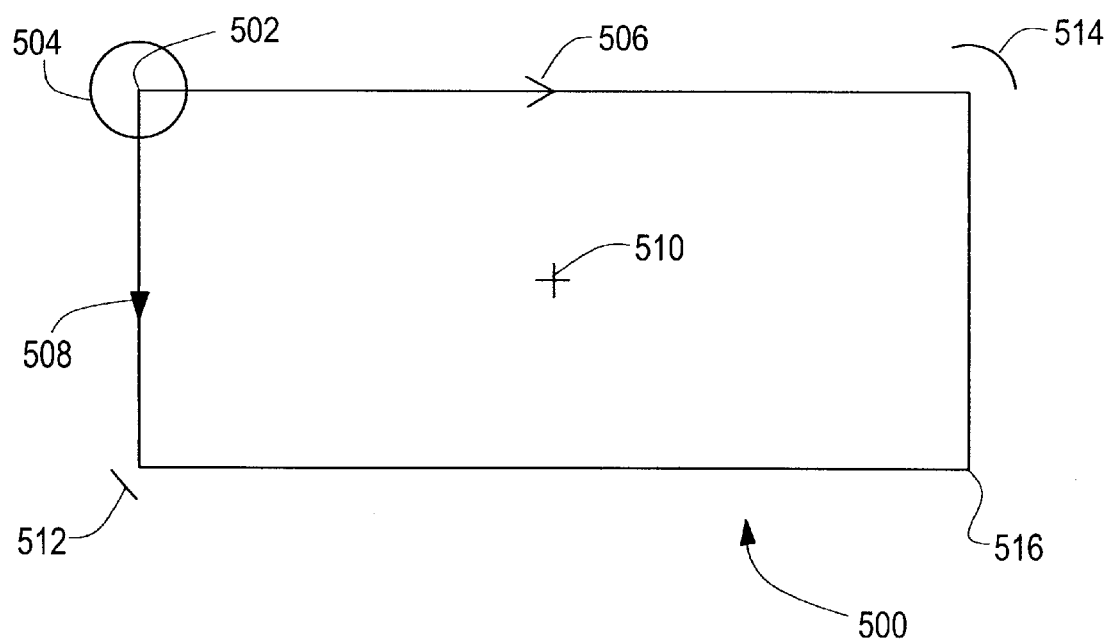
FIG. 5 is a representation of a preferred embodiment of an accented deformable window.

To enhance a user's accessibility to the invention, in a preferred embodiment, the deformable window is accented with symbols to communicate pictorially to the user how to deform the window. An example of an accented deformable window 500 is illustrated in FIG. 5. The accented window 500 has a circle symbol 504 that indicates to the user the area of the deformable window the user should point to in order to change the rotation of the deformable window. The arc symbol 514 indicates the area the user should point to in order to change curvature. The angled hash mark 512 is a skew symbol that pictorially indicates to a user which area of the deformable window 500 to point to cause the deformable window 500 to skew. The accented window 500 is an example of a preferred embodiment of an accented window. However, the deformable window could be marked with only one or different accents than illustrated, where the accents can be symbols, words, colors, for example, as are desired by the user.

Which symbol the user is actuating is determined by processing the positional information returned by the pointing device. In a preferred implementation, the user operates the pointing device to move a fiducial (not shown) superimposed on the image to a specific area in the deformable window and then presses a button on the pointing device. When the user manually presses a button on the pointing device, the pointing device returns the x and y position of the fiducial relative to the image coordinate system, designated as $x_{input}, y_{input}$.

The distance from $x_{input}, y_{input}$ to each of the corners and edges of the deformable window is measured by using the current position of the deformable window, the shape of the deformable window, and a distance equation, such as d=sqrt $[(x_{input}-x_{deformed})^2 + (y_{input}-y_{deformed})^2]$, for instance. The distance determines which area of the deformable window the user is selecting. When the user is close to a corner or edge, (i.e. within a predetermined distance threshold) the deformation associated with that portion of the deformable window is enabled. Other methods or variations to the above implementation can be used to identify where the user is pointing, and will depend upon the application requirements or availability of information. For instance, in a preferred embodiment, pointing almost anywhere inside the accented window 500 enables a translation of the center 510 to intuitively indicate a move.

Turning to the circle symbol 504, if the user selects and drags the corner having the circle symbol 504, the window 500 will turn around a point of the window 500, such as the center point 510 or the origin 502, for instance. An example of a rotation about the origin of the window is shown in FIG. 6B, which illustrates an initial window 612 translated clockwise by an angle 616 approximately equal to 10°. The deformed window 614 has a new angle relative to the x-axis of the image coordinate system.

Figure 7:
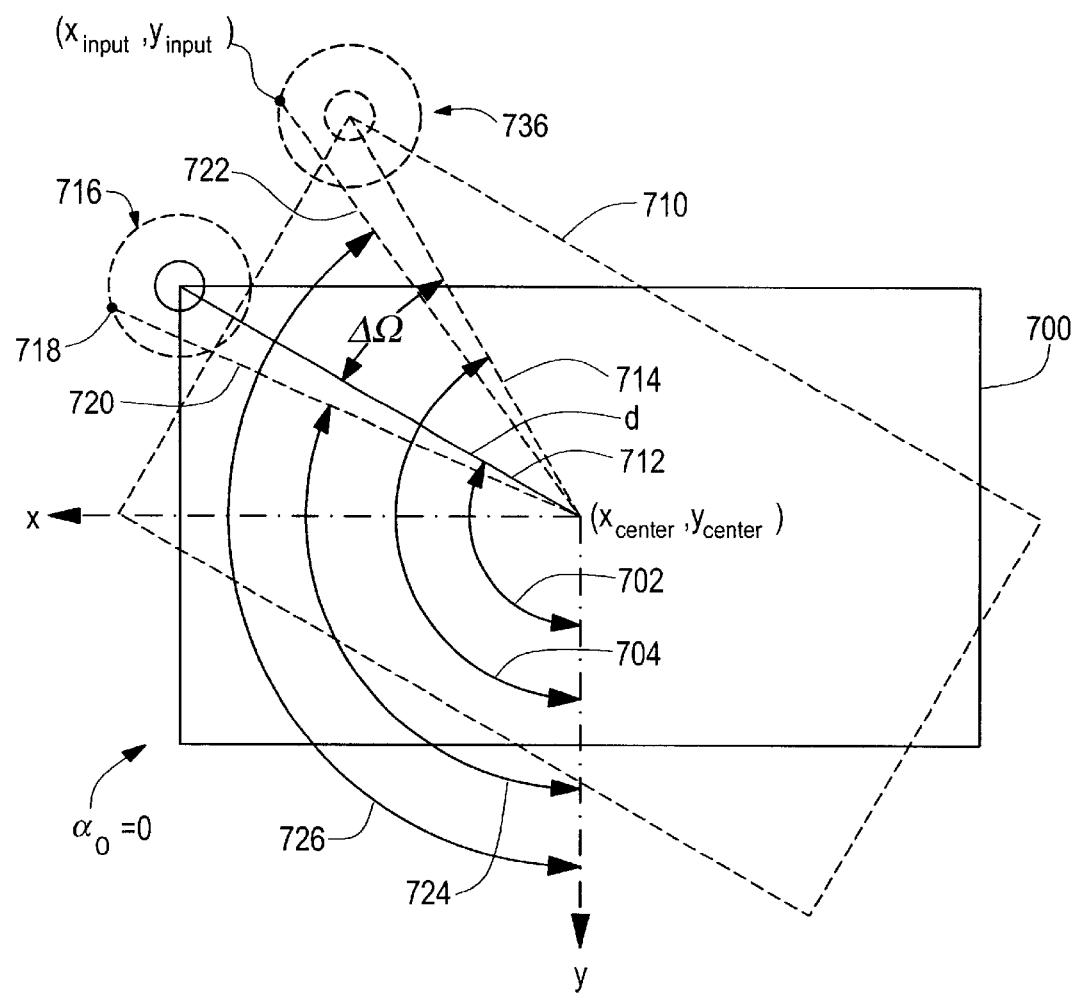
FIG. 7 is a representation of a region of interest at two different rotational positions.

In a preferred embodiment, the window has a range of $0° <= \alpha < 360°$ and the rotation occurs around the center point of the window. When rotation is about around the center point of the window, the coordinates of the origin corner also must change, as illustrated in FIG. 7. To rotate the deformable window, the user is dragging the upper left corner of the deformable window, and the user's input is indicating a change in the rotation angle alpha, $\alpha$, which corresponds to a change in rotation of the deformable window.

$\alpha$ is determined using the $x_{input}$, $y_{input}$ given by the pointing device as the user drags the corner. On FIG. 7, the $\alpha_0$, for the rotated window 710 approximately equals the rotation of the unrotated window 700, $\alpha$, plus the difference between the angle 702 of the line 712 and the angle 704 of the line 714, given as follows: $\alpha \approx \alpha_0 + \Delta\Omega$.

In a preferred embodiment, a threshold area 716 is provided around the origin corner to allow the user to move the corner without being precisely on top of the corner. In this embodiment, $\alpha$ is measured using the x and y coordinates input when the user first choose to rotate the window, which in this example will be designated ($x_{input0}$, $y_{input0}$) at point 718. The same threshold is maintained around the origin corner at the rotated position 736. With these values, $\alpha$ is determined according to the following:

calculate ($x_{center}$, $y_{center}$) using x=w/2 and y=h/2
determine the distance, d
determine the angle of line 712, which equals angle 702 or $\Omega_{origin0}$, using an equation such as $\Omega_{origin0}$=arctan2 (($x_{origin0}-x_{center}$),($y_{origin0}-y_{center}$))
determine angle of line 720, which equals 724 $\Omega_{input0}$
determine angle of line 722, which equals 726 $\Omega_{input}$
the difference of the angles=$\Delta\Omega$=angle 724–726=$\Omega_{input0}$ – $\Omega_{input}$ $\alpha \approx \alpha_0 \Delta\Omega$.
and the origin is redefined as
$x_{origin}$=sin ($\Omega_{origin0}-\Delta\Omega$)*d+$x_{center}$
$y_{origin}$=cos ($\Omega_{origin0}-\Delta\Omega$)*d+$y_{center}$ Moving the pointer while keeping the button on the pointing device pressed will continually generate the $x_{input}$, $y_{input}$ coordinates of the fiducial as inputs, which in turn are used to find $\alpha$ and substantially continuously redraw the deformed window according to the above algorithms. The rotation of the deformable window can be depicted on the GUI in other ways, such as by a series of multi-colored windows can be displayed at staggered positions between the initial position and the final position as the user drags the corner, and the algorithms may also vary.

Returning to FIG. 5, the accented window 500 also includes the arc symbol 514 to change curvature. If the user drags the corner having the arc symbol 514 up or down, the window 500 will bend upward or downward, respectively. An example of an initial window 622 and a deformed window 624, designated by Xed lines, having a –90° change in curvature is shown in FIG. 6C, where the origin of the window is constant.

In a preferred embodiment, the user can curve the window, while the center point of the window remains constant, within a range of –360°<$\phi$<360°, where a positive $\phi$ denotes a curve upward while a negative $\phi$ denotes a curve downward. An example of a window at $\phi$=0°, $\phi$=–30°, and $\phi$=345° is shown on FIG. 6F, where the window 627 represents $\phi$=0°, and deformable window 628 represents $\phi$=–30°, and deformable window 629 represents $\phi$=345°. The origin 630 of the window must also move as well as the angle $\alpha$ when the center point of the window is constant.

Just as with rotation, as $\phi$ changes more than one method can be used to change the parameters and the display of the deformable window. Both $\phi$ and l are calculated using each new $x_{input}$ $y_{input}$ provided by the pointing device and the window is redrawn as previously indicated.

Returning to FIG. 5, the accented window 500 also has angled hash mark 512 for a skew symbol. If the user drags the corner near the angled hash mark, the skew of the window 500 changes. An example of a change in skew is shown in FIG. 6D, where the initial window 632 has been skewed clockwise by an angle 636 approximately equal to 45° to create the deformed window 634.

The window 500 also changes height and width, either alone or in combination. In a preferred implementation, if the user drags a size corner 516 the height will change simultaneously with the width. Alternatively, the width is changed without altering height by dragging the left side or right side of the deformable window; changing the width from the right side also requires a change in the coordinates of the origin. Similarly height can be changed while width remains the same by dragging the bottom or top; changing the height from the top also requires a change in the coordinates of the origin 502.

In a preferred embodiment, the height and width of the window can be deformed from $-\infty<=h<0$ and $0>h=>-\infty$ relative to the origin 502 of the window 500, where the arrows 506 and 508 indicate the positive direction. A negative value for height or width indicates that the window coordinate system has flipped upside-down or mirrored, respectively. An example of a positive and negative change in height is illustrated in FIG. 6E, where the initial window is 642, deformable window 644, designated by dashed lines, has had a positive change in height and deformable window 646, designated by dotted lines, has had a negative change in height.

An example of a move is illustrated in FIG. 6A. The user pointing inside the window 602 and then to the center 608 of the deformed window 604 accomplishes the move. The deformable window can be dragged to its new position or redrawn about the new center point 608, which is the $x_{input}$ and $y_{input}$ returned by the pointing device.

Preferably, the response of the deformable window to the pointing device provides leniency as to where the user has to point to enable a deformation, while minimizing confusion as to which deformation a user is trying to enable. The ability to point within the window to indicate a move is an example of this balance. The interface must differentiate between an $x_{input}$ $y_{input}$ indicating a move and one indicating an edge for a height or width change. Optionally, this compromise is tailored for each application. When some of the deformations are constant or unnecessary, the window accents and responsiveness can be customized for that application by allowing more versatility for the remaining deformations.

In addition to customizing responsiveness, the usefulness of the interface is increased by recognizing more than one series of $x_{input}$ and $y_{input}$ to enable a deformation. For instance, the interface is more robust when the width changes by accessing both sides of the window. Further, allowing rotation while keeping the center point constant is a more intuitive interface than requiring rotation about the origin of the window. Other changes to the method to make it more robust, intuitive or responsive can be implemented and depend solely on the application and the relevant regions of interest.

For each region, the user can alter any combination of the parameters described above. The deformation of FIG. 3A to FIG. 3B embodied a move, a change in curvature, a change in rotation, and a change in aspect ratio. The parameters of FIG. 3B are known, therefore, the characterization of the region of interest by the deformable window provides an advantage over the prior art.

In a preferred embodiment, however, after the polar region is characterized, the polar region is transformed (210) into a rectangular destination window and input for further processing to an OCR software application (212). Typically, an OCR software application locates a rectangular window containing a substantially horizontal character string during run-time, and then reads the character string, as is further described in Vision Tools, Optical Character Recognition, Chapter 7, by Cognex Corporation, 1996, incorporated herein by reference.

Figure 3C:
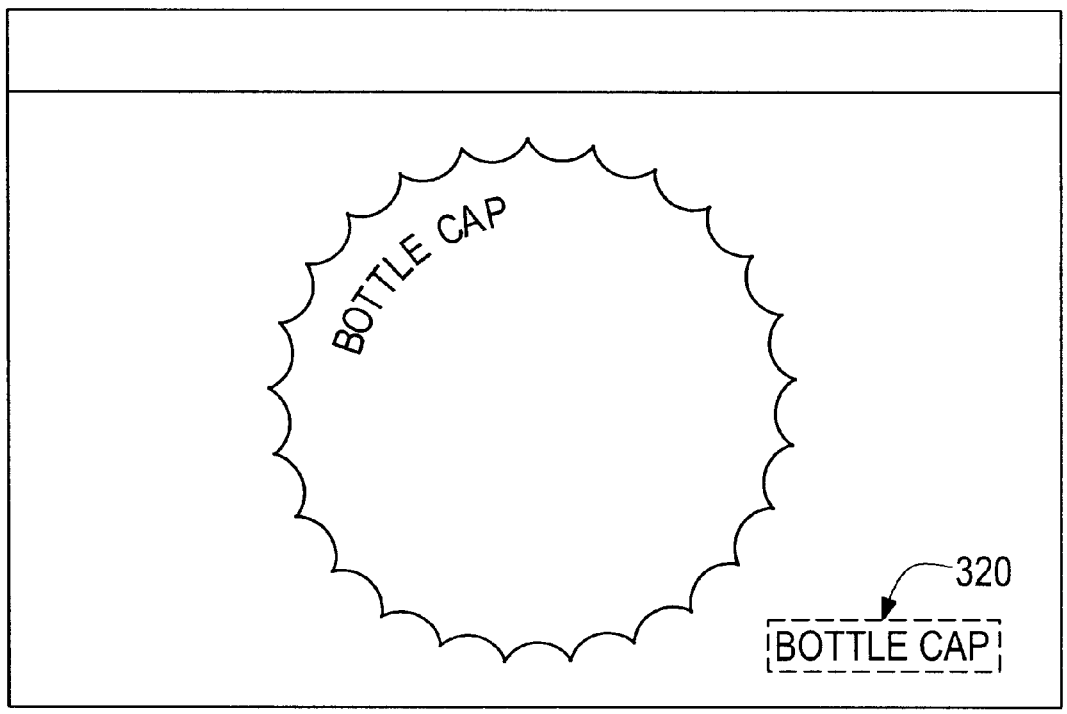
FIG. 3C is a representation of the character string of the bottle cap of FIG. 3A translated and transformed to a destination window particularly suited for an OCR application, the destination window is superimposed over the image of the bottle cap of FIG. 3A on the graphical user interface, not drawn to scale.

FIG. 3C shows a destination window 320 containing a transformed polar region superimposed upon the image of the bottle cap, which is the source image, and displayed on the same GUI. Alternatively, the rectangular window 320 can be directly input into the OCR software application and not displayed, displayed next to the source image, or without the source image, as desired by the user.

During the transformation, the pixels enclosed within the deformed window are mapped to pixels enclosed within the rectangular region in memory and optionally displayed on the GUI. In a polar-to-rectangular transformation, the pixels do not map one-to-one, as is illustrated using FIG. 8A and FIG. 8B, not drawn to scale. A polar region does not have a constant number of pixels 888 across its height. The polar region 800 has more pixels along the outside boundary 804 and less along the inside boundary 806. Consequently, when transformed to a rectangular destination window 802 of a constant width, the pixels do not map one-to-one.

The difference is more easily illustrated by counting the number of segments within the polar region 800 and the rectangular region 802, the sizes of the segments is greatly exaggerated to illustrate a rapid rate of change in the number of segments between each row. In this example, the polar region 800 has 9 polar segments along the outside boundary 804, 7 polar segments in the middle region and 5 polar segments along the inner boundary 806. Compared to the rectangular destination window 802, with a constant width of 7 segments, the polar region 800 has more segments on the outside boundary 804, whose pixels will be mapped many-to-one, the same at the middle, whose pixels will be mapped one-to-one, and less at the inner boundary 806, whose pixels will be mapped one-to-many.

Figure 8A:
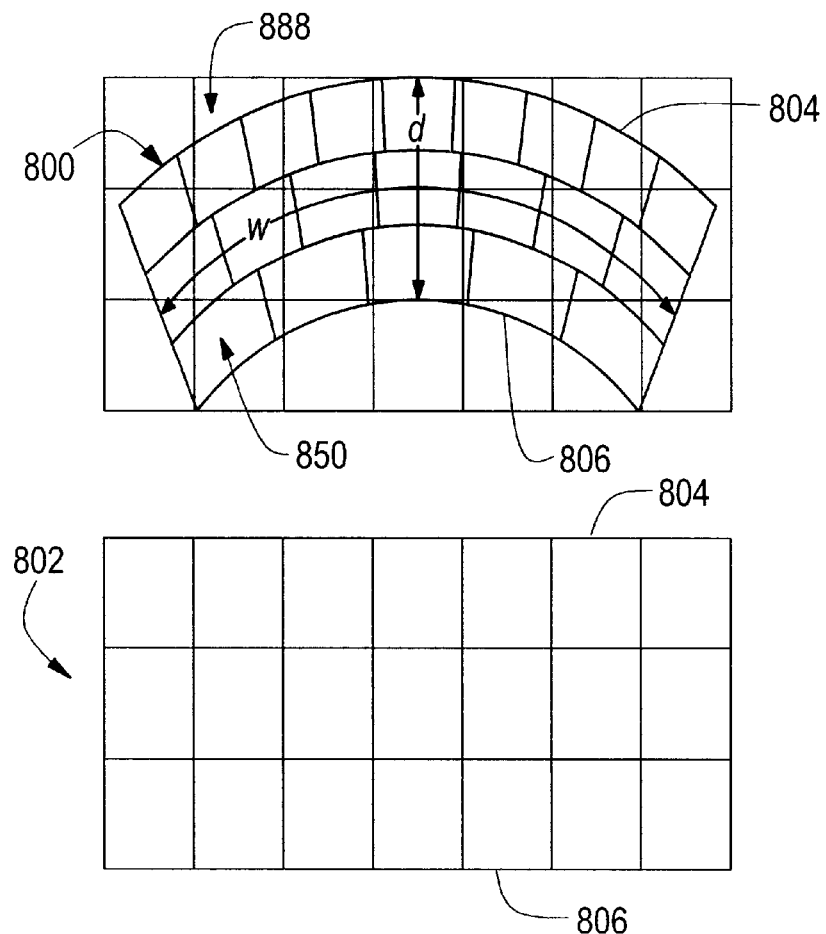
FIG. 8A is a representation of a deformable window having a polar shape and a rectangular destination window, not drawn to scale.
Figure 8B:
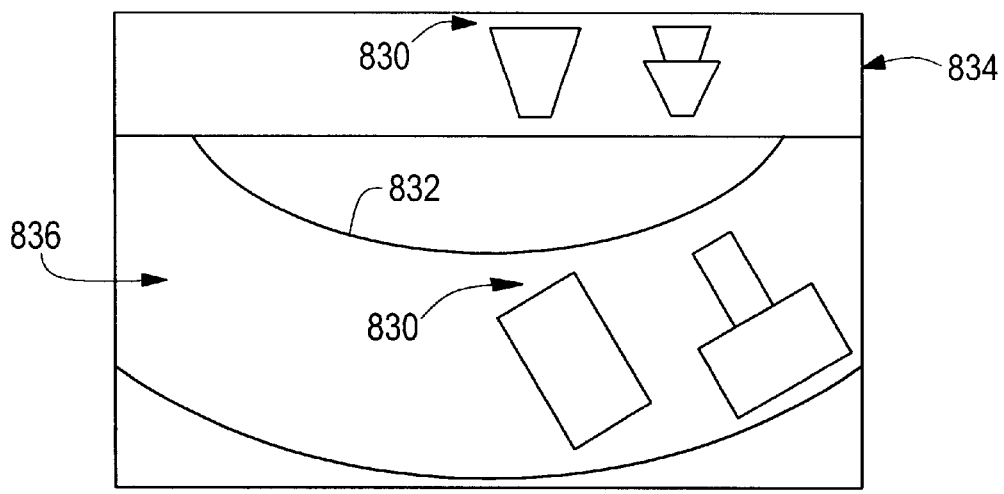
FIG. 8B is an image of both a bottom-view of part having numbering positioned along an arc and a rectangular destination window containing spatially-exaggerated numbering, not drawn to scale superimposed upon the image of the circular part.

The ratio of pixels within the polar window 800 to the ratio of pixels in the rectangle window 802 is a function of the distance along d. In FIG. 8A, the closest correlation is the d value where the polar region 800 and the rectangular region 802 have the same width, which in this case is along the midline of the polar region 800. The same general relationship exists with each transformation to a destination window. The pixels can map one-to-one, many-to-one, or one-to-many depending upon the shapes of the deformable window and the destination window. An exaggerated example of the effect in an OCR application is illustrated in FIG. 8B, where the top of the characters 830 along the inner boundary 832 in polar region 836 are shown as stretched after the characters 830 are transformed to the rectangular window 834.

The application's requirements for spatial accuracy in the destination window dictate how the transformation is completed. For applications that require accuracy, interpolation can create pixel(s) having an appropriate intensity value that is added to the bottom of the rectangular window or replaces multiple pixels at the top of the rectangular window.

For a simpler application, pixels along the outer boundary are deleted, while pixels with similar intensity values are added along the inner boundary. In a preferred implementation, deforming the window using the Case1 or Case 2 formulas detailed above result in truncation or rounding errors that add and delete pixels. The number of pixels change because each new x and y does not correspond to one new pixel position of $x_{deformed}$, $y_{deformed}$. For instance, for a change in curvature to $\phi=15$, $\alpha=0$, $h=20$ and $w=15$, $x_{origin}=y_{origin}=0$, $x_{deformed}$ for $x=11$ and $y=10$ is 1.1141504 and $x_{deformed}$ for $x=12$ and $y=10$ is 1.2158542. In a computer system, this inability to represent the two positions with two values for $x_{deformed}$ is known as floating point error and is a consequence of trying to represent a continuous function using a discrete set of values. Typically, the values are either rounded or truncated, and when combined may result in a region containing a different number of pixels in some instances, such as the example of $\phi=15$.

Figure 9A:
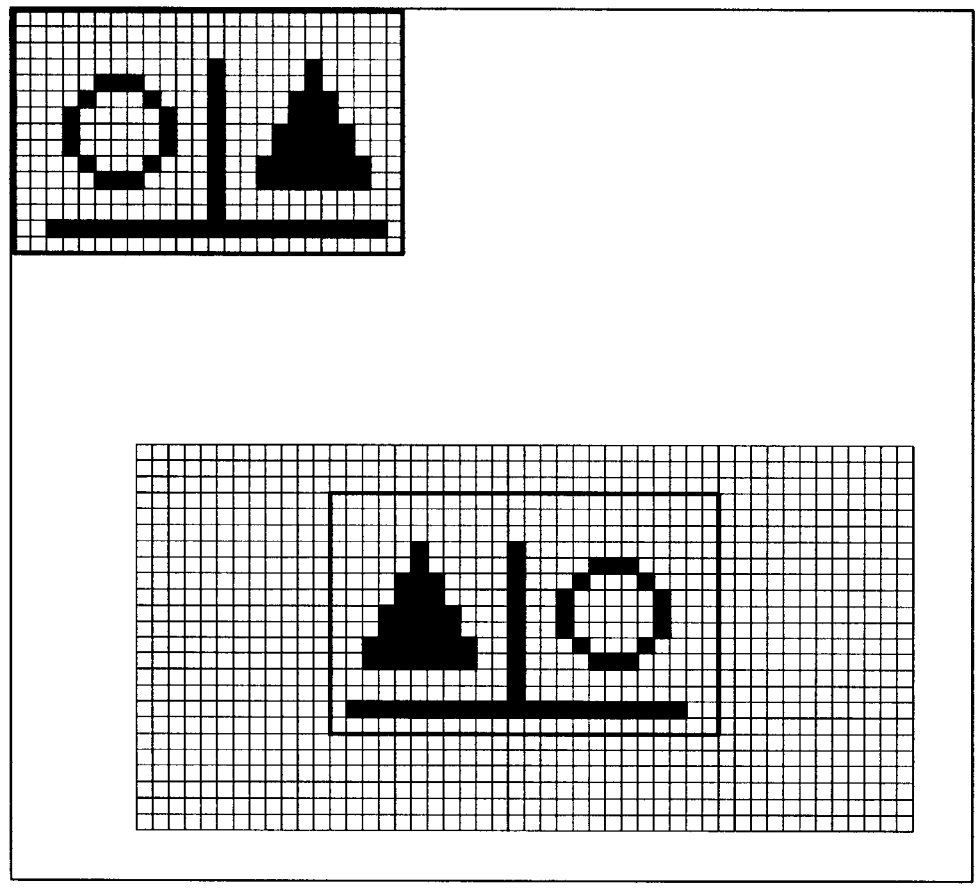
FIG. 9A is a representation of a region of interest before and after a width transformation, and more particularly a mirror transformation, where the transformed region is enclosed within a destination window.
Figure 9B:
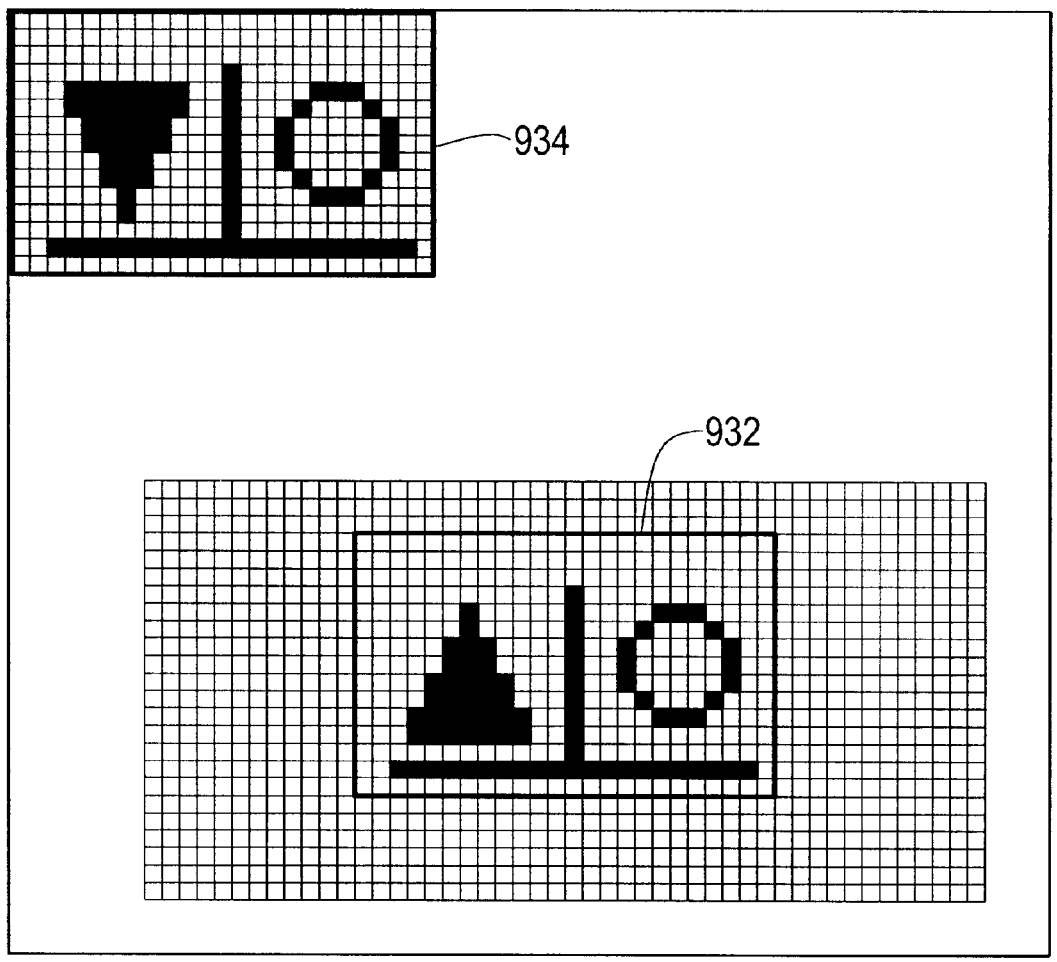
FIG. 9B is a representation of a region of interest before and after a height transformation, and more particularly a flip transformation, where the transformed region is enclosed in a destination window.
Figure 9C:
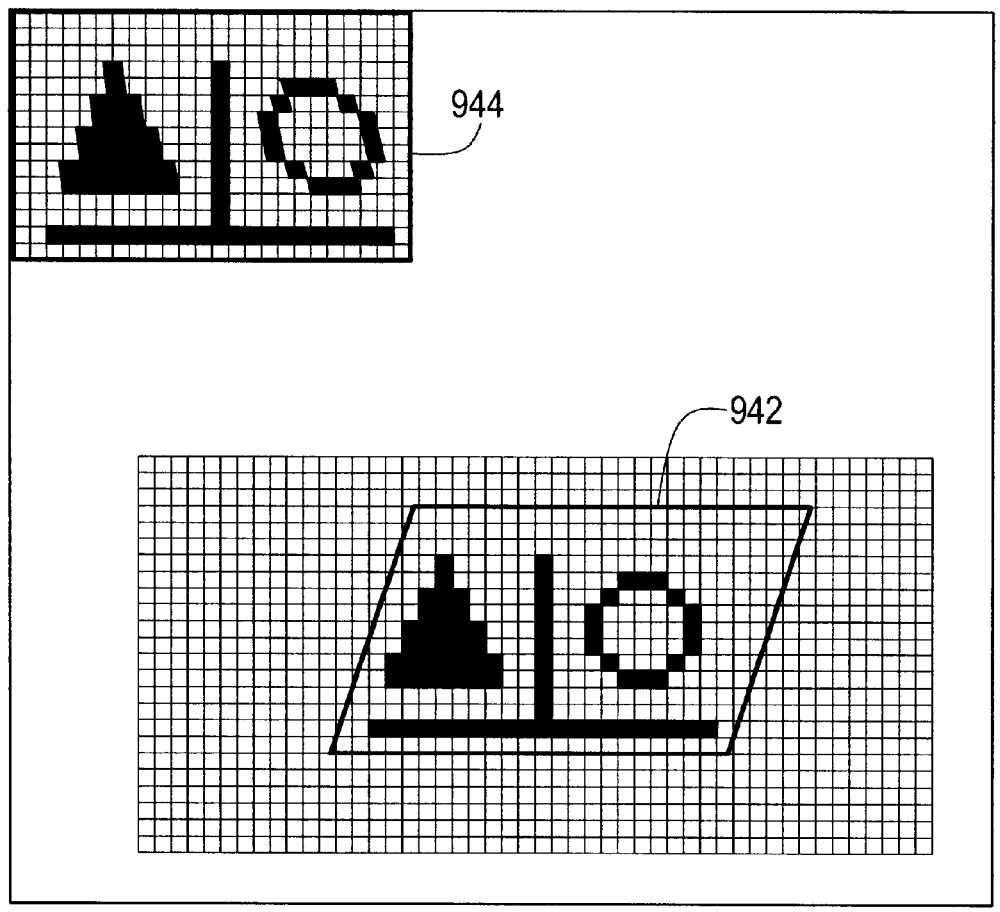
FIG. 9C is a representation of a region of interest before and after a skewing transformation, the transformed region is enclosed in a destination window.

Other transformations besides polar-to-rectangular are illustrated in FIGS. 9A–9C. FIG. 9A is a representation of a region of interest before and after a width transformation, showing a mirroring effect. FIG. 9B is a representation of a region of interest before and after a height transformation, illustrating a flipping effect. Finally, FIG. 9C is a representation of a region of interest before and after a skewing transformation, the transformed region is enclosed in a destination window.

Figure 10:
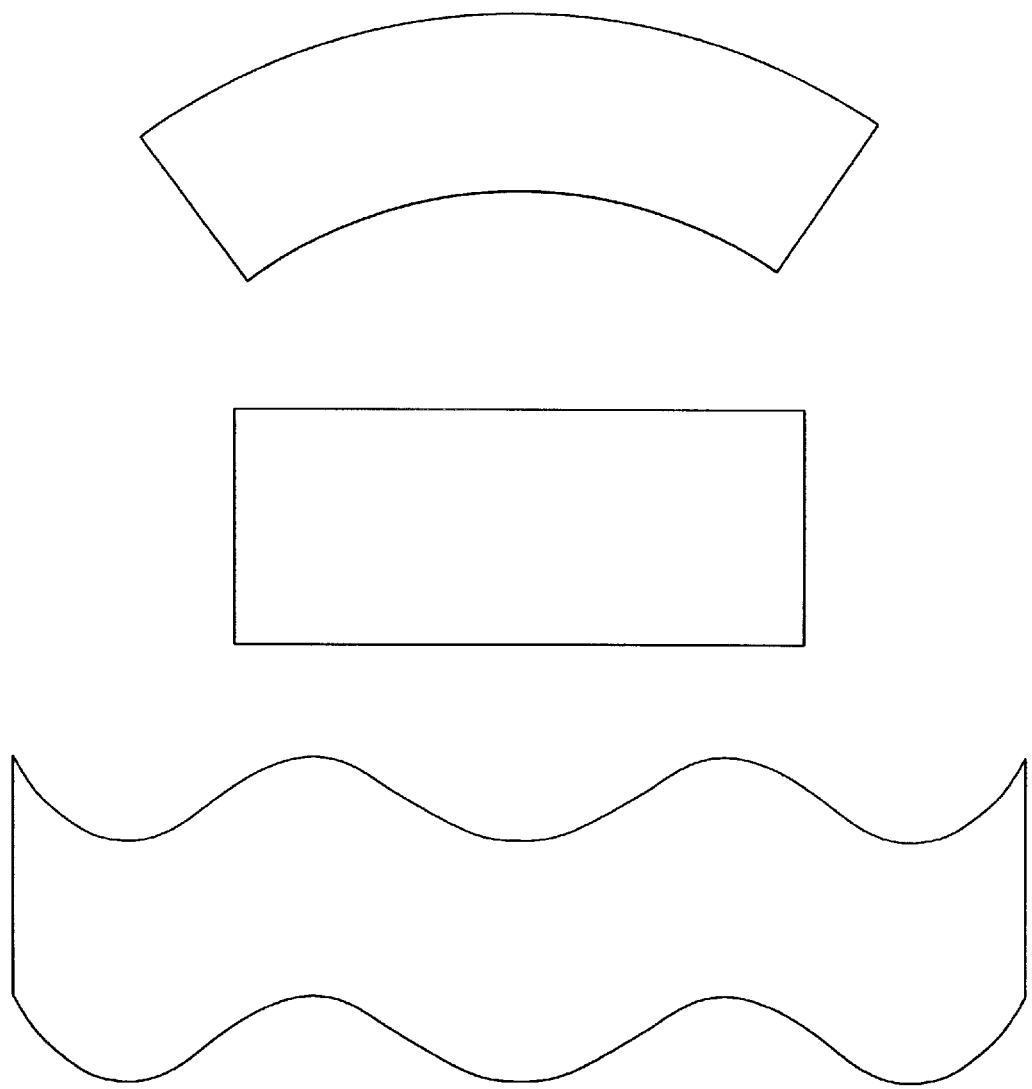
FIG. 10 is a representation of additional destination windows that may be produced using the method and apparatus of the invention.

Destination windows other than rectangles are possible, such as those illustrated in FIG. 10, for instance. The destination window can be a position to where the pixels are mapped 1:1. In such an example, the destination region would have the same shape as the deformable window. Transforming a region of interest to a shape other than a rectangle is particularly useful in non-OCR applications.

For instance, a change in height can be used to make hardware restrictions of a printer compatible with the image data to be printed. For instance, if during printing a printing medium is moved through an ink jet printer faster than specified by the printer specification, the resulting print is stretched because the printer speed does not match the rate of delivery of the image data. However, if the image data is transformed using this method to have a smaller height, the medium can be moved through the printer faster and the resulting print will not appear stretched.

Figure 11:
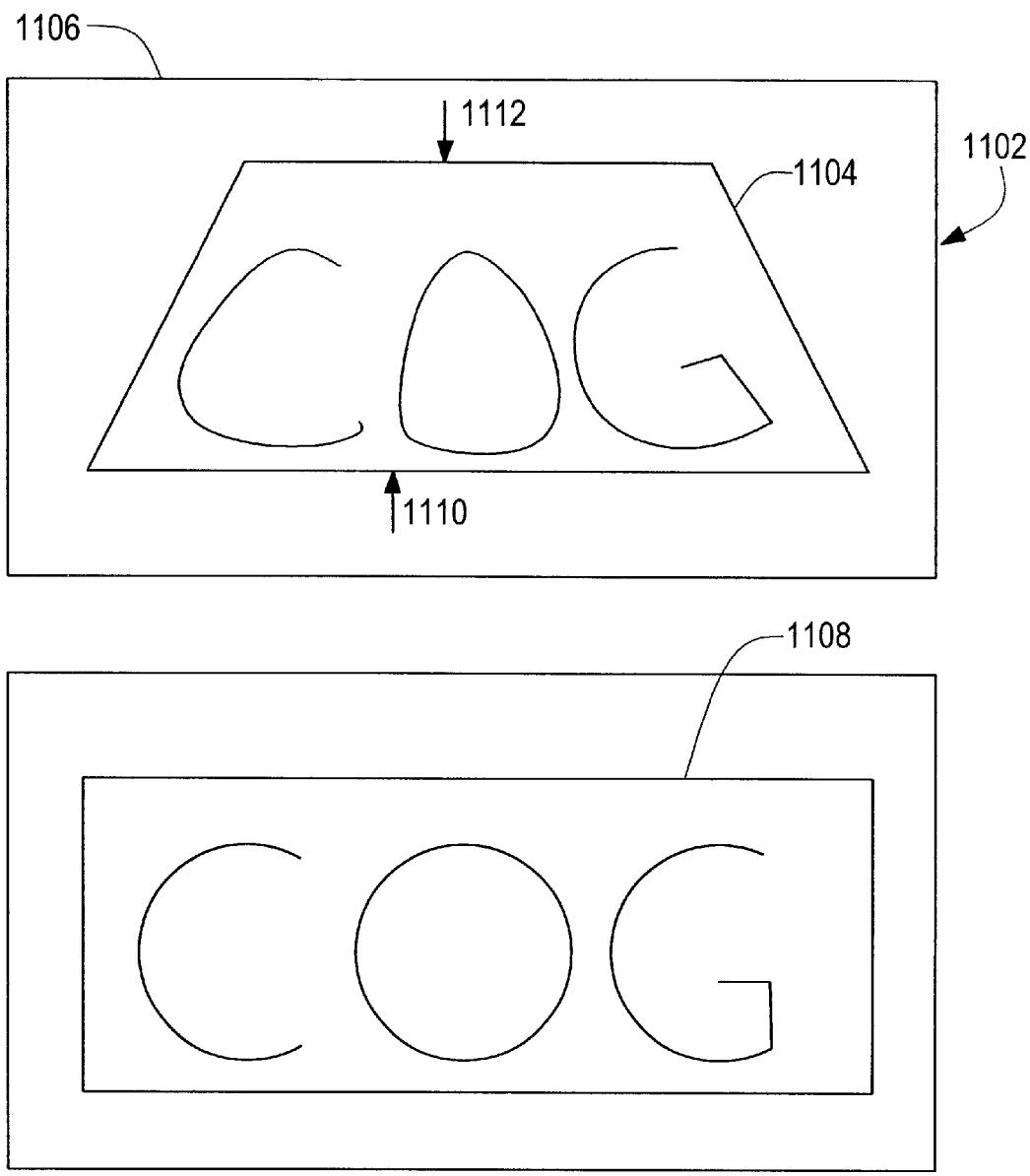
FIG. 11 is an image of text acquired by a camera at an angle, where the text is surrounded by a deformable window. An image of transformed text within a rectangular destination window is also shown, where the transformation to the rectangular destination window substantially compensates for the alteration of the image caused by the angle of the camera.

Another example, for the use of this method is to use the deformable window to compensate for acquiring an image at an angle. In FIG. 11, an altered acquired image 1102 can be captured within the deformable window 1104 on the GUI 1106 and transformed to a destination window 1108 where the image is unaltered. The data within the image taken at an angle would have greater resolution on the side closest to the camera 1110 and less resolution at the side farthest from the camera 1112. Therefore, the pixels closest to the camera would contain a smaller amount of spatial information than the pixels farther away from the camera. To compensate for this difference, the transformation would be similar to a polar-to rectangular transformation; the destination window would have a different number of pixels than the top and bottom of the deformed window, such as a transformation from a trapezoidal-to-rectangular transformation. The positions closest to the camera loose several pixels, as does the outside of a polar region, and the positions farthest away gain several pixels, as does the inside of a polar region during a transformation to a rectangle. The resulting image within the destination window is corrected for the error in acquisition angle and then can be used as input to a machine-vision vision system.

Other modifications and implementations will occur to those skilled in the art without departing from the spirit and the scope of the invention as claimed. Accordingly, the above description is not intended to limit the invention except as indicated in the following claims.

What is claimed is:

1. A method for characterizing a region of interest of a digital image, the method comprising:

displaying the digital image using a graphical user interface;

displaying a deformable window using the graphical user interface;

graphically defining, by a user, a shape and position of the deformable window such that the deformable window encloses the region of interest;

transforming the region of interest using the shape and position to substantially fit within a destination window; and providing the region of interest within the destination window as input for image analysis.

2. The method of claim 1, wherein providing the region of interest further includes:

providing the region of interest as input to an optical character recognition program.

3. The method of claim 1, wherein the region of interest is a polar segment and the destination window is a rectangle.

4. The method of claim 1, wherein the region of interest differs in shape from the destination window.

5. The method of claim 1, wherein displaying the deformable window using the graphical user interface includes:

graphically identifying areas of the deformable window with particular deformations, and wherein graphically defining, by the user, the shape and position of the deformable window further includes:

performing one of the particular deformations upon the user specifying a corresponding area of the deformable window.

6. The method of claim 1, wherein graphically defining, by the user, the shape and position of the deformable window further includes:

moving the deformable window to a new position, the new position being supplied by the user.

7. The method of claim 1, wherein graphically defining, by the user, the shape and position of the deformable window further includes:

changing a height of the deformable window to a new height, the new height being supplied by the user.

8. The method of claim 1, wherein graphically defining, by the user, the shape and position of the deformable window further includes:

changing a width of the deformable window to a new width, the new width being supplied by the user.

9. The method of claim 1, wherein graphically defining, by the user, the shape and position of the deformable window further includes:

rotating the deformable window to a new angle, the new angle being supplied by the user.

10. The method of claim 1, wherein graphically defining, by the user, the shape and position of the deformable window further includes:

changing a curvature of the deformable window to a new curvature, the new curvature being supplied by the user.

11. The method of claim 1, wherein graphically defining, by the user, the shape and position of the deformable window further includes:

changing a skew of the deformable window to a new skew, the new skew being supplied by the user.

12. The method of claim 1, wherein user supplied variables are accommodated, and a shape of the destination window is one of the user-supplied variables.

13. The method of claim 1, wherein transforming the region of interest using the shape and position to substantially fit within the destination window includes:

displacing each pixel of the region of interest within the deformable window to a destination position within the destination window.

14. The method of claim 1, wherein transforming the region of interest using the shape and position to substantially fit within the destination window includes:

changing a number of pixels of the region of interest within the deformable window to substantially fit within the destination window.

15. An apparatus for transforming a region of a digital image where the digital image is displayed on a display means, the apparatus comprising:

a deformable window disposed on the display means defining a region within the digital image, the deformable window actuateable by a user such that the region within the deformable window varies as specified by the user;

a destination window having destination parameters, the destination parameters suitable as input for image analysis; and transformation means adapted to transform the region within the deformable window to substantially fit within the destination window, whereby the region in the destination window is adapted to be input for the image analysis.

16. The apparatus of claim 15, wherein the destination window differs from the deformable window.

17. The apparatus of claim 15, wherein the destination window is a rectangle and the deformable window is a polar segment.

18. The apparatus of claim 15, wherein portions of the deformable window, actuateable by the user, are adapted to deform different aspects of the deformable window, respectively.

19. The apparatus of claim 18, wherein the portions of the deformable window, adapted to deform the different aspects of the deformable window, have graphical accents positioned substantially thereon, the graphical accents indicate the different aspects each of the respective portions are adapted to deform.

20. The apparatus of claim 18 wherein the deformable window has an operative state and an inoperative state, the deformable window adapted to be moved from the inoperative state to the operative state by a user, the deformable window enclosing a portion of the source image in the inoperative state and having initial parameters, the deformable window enclosing a different portion of the source image and having associated updated parameters in the operative state, the updated parameters defining the region of interest.

21. A graphical application for parameterizing a region of interest of a source image, the apparatus comprising:

a deformable window having an operative and an inoperative state adapted to be moved from the inoperative to the operative state by a user, the deformable window enclosing a portion of the source image in the inoperative state having initial parameters, the deformable window enclosing a different portion of the source image and having associated updated parameters in the operative state, the updated parameters defining the region of interest;

a destination window having destination parameters suitable for further processing; and transformation means adapted to transform the region within the deformable window using the updated parameters to substantially fit within the destination window, whereby the region of interest in the destination window is adapted to be input for the further processing.

22. The apparatus of claim 21, wherein the initial parameters and the updated parameters include position.

23. The apparatus of claim 21, wherein the initial parameters and the updated parameters include geometrical descriptions.

* * * * *